United States Patent
Beck et al.

[15] 3,700,854
[45] Oct. 24, 1972

[54] DRIVE FOR A MOVING WELDING APPARATUS

[72] Inventors: Otto Beck, Stuttgart-Heumaden; Georg Spalding, Stuttgart, both of Germany

[73] Assignee: Fr. Hesser Maschinenfabrik AG, Stuttgart-Bad Cannstatt, Germany

[22] Filed: March 5, 1971

[21] Appl. No.: 121,352

[30] Foreign Application Priority Data

March 7, 1970 Germany..........P 20 10 961.9

[52] U.S. Cl..............................219/243, 53/DIG. 1
[51] Int. Cl..............................................H05b 1/00
[58] Field of Search....219/243; 53/DIG. 1, 273, 279; 156/582, 583

[56] References Cited

UNITED STATES PATENTS 2,749,817  6/1956  Piazze et al............156/583 X
3,113,903  12/1963  Harris et al............156/571 X

*Primary Examiner*—C. L. Albritton
*Attorney*—Edward E. Sachs

[57] ABSTRACT

A drive including a plurality of Kardan joints, adapted to provide adjustable cyclic variations, for a movable welding or sealing equipment station effective to establish a transverse seam in a foil web movable at a uniform rate. The above equipment is used in conjunction with a machine for making, filling or closing packages.

7 Claims, 5 Drawing Figures

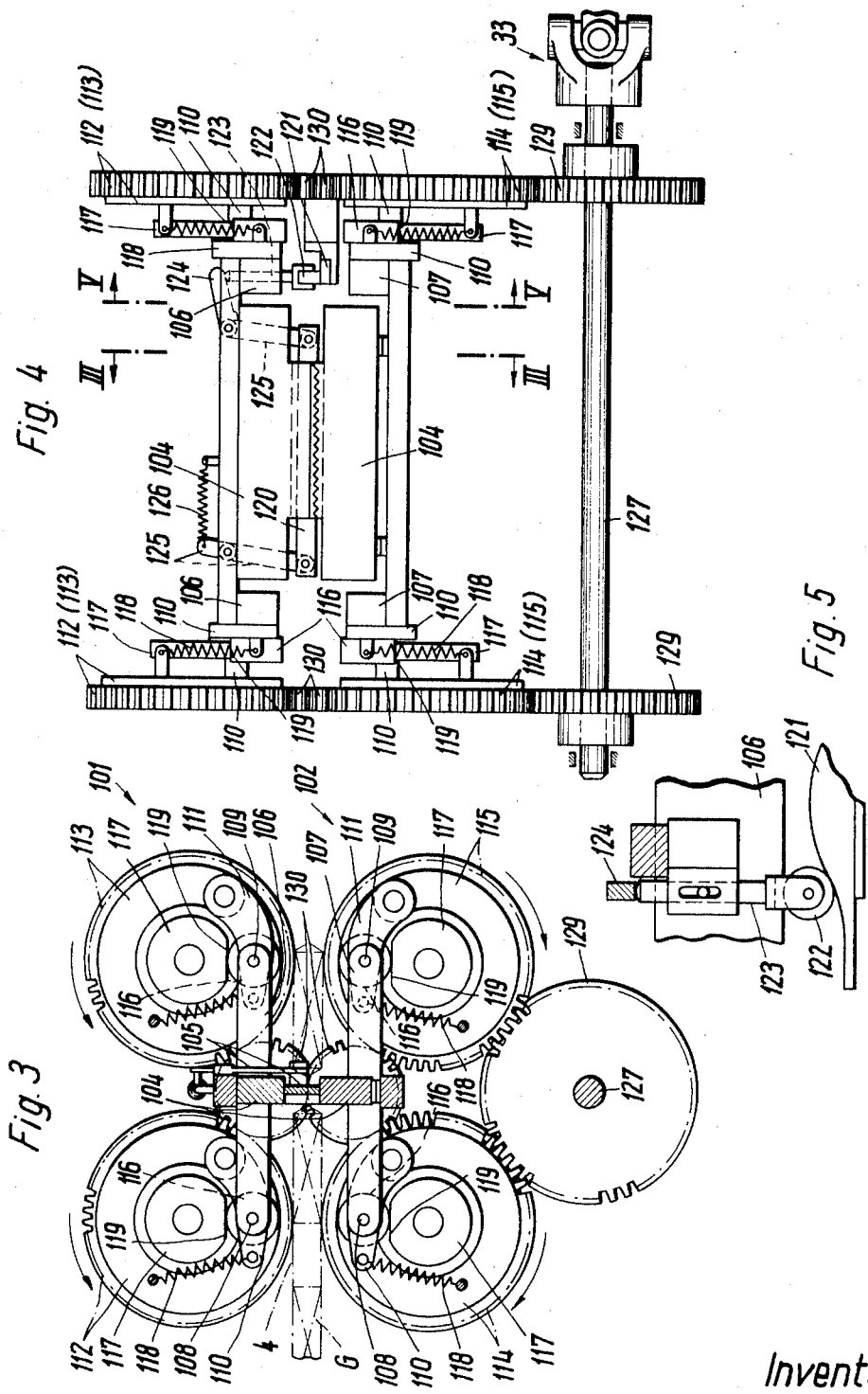

DRIVE FOR A MOVING WELDING APPARATUS

This invention relates generally to a drive and, more particularly, to a drive for an apparatus to cross-seal or weld endless foil webs or tubes, at a uniform speed, and in which the seal tools move along a continuous path and temporarily accompany the foil web.

In the prior art, cross-weld arrangements using, in addition to known welding tools, also tools for separating the foil web are usually a part of a continuously working packing or tube bagging machines. During each work cycle, or rotation of the weld tools, selectable lengths of the foil tube are conveyed through the cross-weld arrangement. Therefore, the rate of rotation of the weld tools must be varied periodically so that when the weld tools engage the foil tube, no excessive relative movement will occur. It is therefore necessary to establish between the main drive of the machine and the weld arrangement a drive which will provide speed variations.

A drive for providing periodic variations is known in theory and consists essentially of two pair of elliptical gears arranged in series. For shifting the gears at least three elliptical wheels are mounted in selectable positions on a drive shaft. In adjusting the angle of variation, which can only be accomplished when the drive is shut down, the second and third elliptical wheels must be adjusted relative to each other on the common shaft. In addition, the first and the fourth elliptical gear wheel must be adjusted relative to the shafts on which they are carried. This is necessary in order to retain the phase position of this variation. The adjustment during the shut-down is time consuming and must be repeated several times after brief test runs of the machine.

It is also known to provide differential drives by means of which the second elliptical gear can be adjusted relative to the third and the first and the first and fourth can be adjusted relative to the input or output shafts. Since, however, the variable drive is supposed to work tolerance free, the differential drive requires an economically unacceptable high cost of fabrication. Moreover, the adjustment of the differential drive is quite difficult for technically untrained personnel. Thus, it would be necessary to link the adjusting means for the drive which, however, would again increase the cost.

In order to avoid the above described disadvantages, the present invention provides a drive for use in conjunction with a sealing arrangement of a packaging machine, or related equipment, having a Kardan joint arrangement whose joint angle is adjustable.

Another aspect of the present invention resides in the provision of a drive in which four Kardan joints are arranged in series and connected by three intermediate shafts. The joint angles or axes, are displaced relative to each other by 90°, and the center shaft of the three intermediate shafts is adjustably arranged transverse to the elongated middle axis of the four Kardan joints.

Inasmuch as the axes of the Kardan joints of the drive are alternatingly displaced 90° relative to each other, and not in pairs parallel to each other, as is usual practice in Kardan drives, the periodic variation of the rotary movement is multiplied and can be adjusted as desired by means of transversely shifting the center shaft and thereby affecting the joint axes of the Kardan joints.

The drive in accordance with this invention is adjustable during operation thereof and without changing the phase position of the cyclic variation. Therefore, the drive can be adjusted quite readily by technically untrained personnel. Also, substantial savings can be achieved since Kardan joints are commonly mass produced articles. The drive can be utilized for horizontal and continuously working tube bag and packing machines as well as for vertical working tube bag producing, filling and closing machines, and for simple bag making machines. The drive is suitable wherever tools accompany packaging or parts thereof along a certain path and thereafter return to their initial position.

A still further aspect of the present invention resides in a drive comprising the Kardan joints for providing an adjustable periodic variation and a wheel drive for translating the movement to a higher r.p.m. Another Kardan joint drive is arranged beyond the wheel drive whereby the range of the variation of the drive for the welding device can be still further increased.

By placing the adjustable Kardan joint drives in series it is possible to drive the cross-weld device in such a manner that the welding tools move with a nearly constant speed, which can be selected, for a relatively long portion of the overall path.

As a result, the weld tools can follow the foil tubes, which are to be cross-welded, along a relatively long path whereby the capacity of the transverse welding device and the machine as a whole can be increased. The term "Kardan" or "Cardan" joint is used herein to denote a universal joint which is a linkage whose purpose is to cause mutual rotation of two shafts whose axes do not coincide. Such joints are conventional and are well known in the art.

For a better understanding of the present invention, together with other and further objects thereof, reference is had to the following description taken in connection with the accompanying drawings, and its scope will be pointed out in the appended claims.

In the drawing:

FIG. 3 is a side view of the welding apparatus partly in section taken along line III—III of FIG. 4;

FIG. 4 is a view of the welding apparatus shown in the direction of movement of the foil material; and FIG. 5 is an enlarged sectional view taken along line V—V of FIG. 4, showing welding apparatus.

Figure 1:
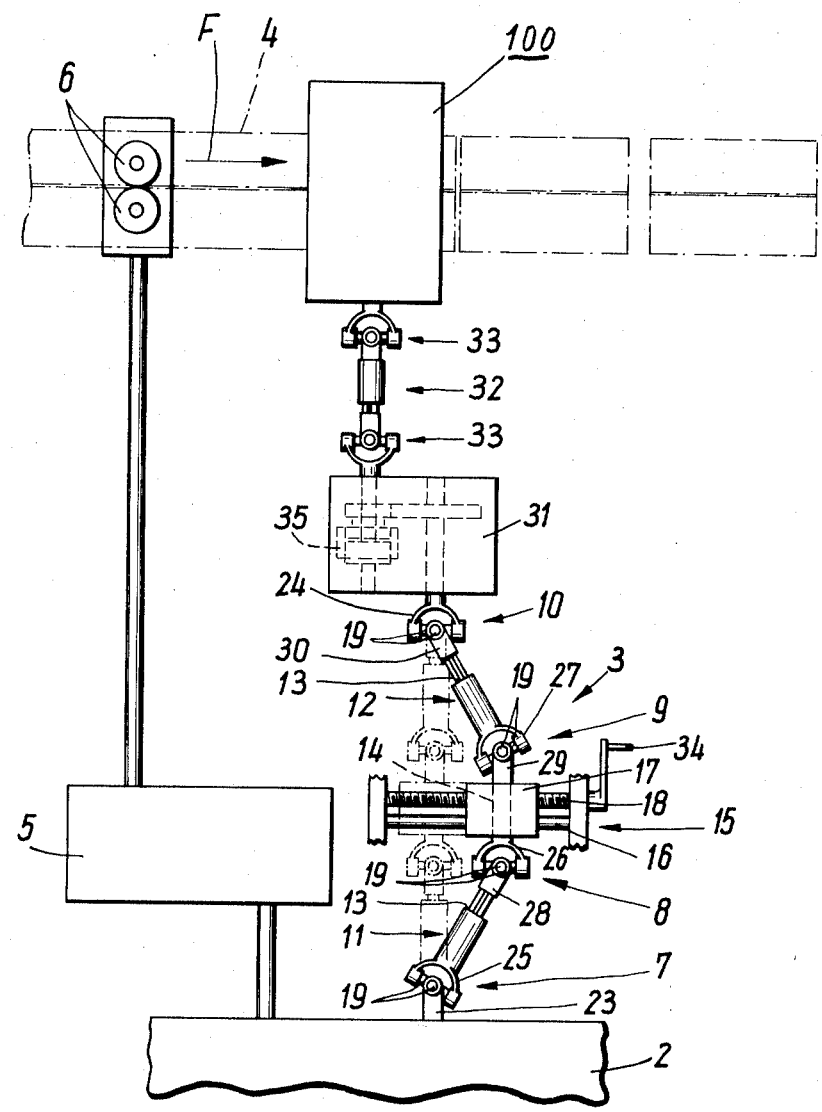
FIG. 1 is a schematic illustration of a drive in accordance with this invention for driving a welding apparatus.

Referring now to the drawing there is shown in FIG. 1 a cross-welding device 100, essentially of known construction, a main drive 2 and a drive 3 for providing an adjustable periodic variation in accordance with the invention. The drive 3 is disposed between the welding device 100 and the main drive 2.

Details of the welding device 100 are shown in FIGS. 3 to 5 and include, basically, two quadrilateral bell-crank lines (Gelenkvierecken) 101 and 102 arranged on the two sides of the conveyor path of the workpiece G surrounded by foil tubes 4, and further includes heat seal jaws 104 and a separator tool 105 secured on connecting rods 106 and 107 of the links 101,102. The two rods 106 and 107 are connected to lever arms 110 and 111 by means of links 108 and 109, which in turn are tiltingly mounted on spur wheels 112 and 113, respectively, 114 and 115. The lever arms 110 and 111 each carry a roll 116 which rolls on a cam disc 117 arranged coaxial relative to the spur wheels 112 to 115. For this purpose, the lever arms 110 and 111 are drawn against the cam disc 117 by means of springs secured on spur wheels 112 to 115. Each cam disc 117 has a flat spot 119 which is effective to cause the connecting rods 106 and 107 and the heat seal jaws 104 to carry out a horizontal movement over a certain angle of rotation during the rotation of the links 101 and 102. This achieves that the seal jaws 104 accompany the foil tube over a certain length of the conveyor distance and thereby provide sufficient time for the seal or welding step to be performed even at a high machine speed.

Simultaneously with sealing the cross-seam, the finished packages are also separated from the foil tube. The separator tool 105 is effective to provide this function. The tool 105 engages a knife 120 mounted on the upper connecting rod 106 and disposed in a recess of the upper heat seal jaw 104. The operation of the knife 120 is controlled by a stationary guide rail 121 engaged by roll 122 mounted on the upper connecting rod 106. The roll operates the knife 120 mounted on two tilting arms 125 by means of push rod 123 and lever arm 124, which is also connected to a pull spring 126. The above described operation causes a draw cut by the knife 120.

The main drive 2 also serves to drive a pair of rolls 6, see FIG. 1, by means of an intermediate drive 5 having an adjustable transformation ratio. The rolls 6 may be arranged either to advance the foil tube 4 in the conveyor direction F, at a pre-selected speed, or may be adapted for simultaneous conveying and welding the foil web in a manner to create an endless foil web 4.

The drive 3 is adapted for establishing cyclic variations in the rotary movement and is comprised of four Kardan joints 7,8,9 and 10, two intermediate shafts 11,12 provided with a length equalizer 13, an intermediate or connecting shaft 14 having a fixed length as well as an adjustment or control mechanism 15. The mechanism 15 comprises a control or adjustment carriage 17 riding on a guide rod 16, with the carriage being displaceable transverse to a connecting line between the Kardan joints 7 and 10 by rotation of a threaded spindle 18 by actuation of a handle 34 connected to the latter. The intermediate shaft 14 which carries the joints 8 and 9, is rotatably mounted in the carriage 17. Disposed between the Kardan joints 7,8 and 9,10 are the intermediate shafts 11 and 12 and length compensator 13. In the above embodiment the shafts 11,12 and 14 are provided at their ends with link journals 19 in such a manner that they cross each other at right angles.

The adjustment carriage 17 is controlled in such a manner that when the Kardan joints 7,8,9 and 10 and the three intermediate shafts 11,12 and 14 have a common alignment, no cycle variation is created during the operation of drive 3 between the first half 23 of the Kardan joint 7 and the second half 24 of the Kardan joint 10. However, when the carriage 17 is brought into a position where the journals of the second half 24,25,26 of Kardan joints 7,8,9 and 10 are angularly related to the first half 23,28,29 and 30, the cyclic variation occurs during rotation on the second halves relative to the first halves, in a manner so that the second halves turn twice as fast and twice as slow as the first halves. In view of the mentioned alignment of the link journal 19 the variations are multiplied up to the second half 24 of the Kardan link 10. Thus, there is established in the drive 3, in accordance with this invention, an effect which is just the opposite of that normally obtained by the use of Kardan joints in pairs and in which the link journal engaging the intermediate shaft is aligned in a parallel position.

The Kardan joint 10 may be connected directly to the cross-weld device 100. However, in order to increase the work life of the cross-welding arrangement 100, it is advantageous that during a single revolution only one acceleration and deceleration occurs. Therefore, there is provided a gear drive 31 between the welding device 100 and the drive 3, in such a manner that for each revolution of the moving weld tools of welding device 100, the Kardan joints 7,8,9 and 10 move only half a revolution.

When the cross-welding device 100 is used in conjunction with a packaging machine for workpieces G of different heights, and therefore, should be adjustable for heights relative to the bottom side of the foil tube 4, there is mounted between the drive 31 and the cross-weld arrangement 100 a Kardan shaft 32 whose links 33 are aligned in the usual manner so that when the links are moved outward no additional variation is generated.

The wheel or gear drive 31 may be provided with a conventional clutch 35, so that the phase position of the welding tools relative to Kardan joints 7,8,9 and 10 is adjustable. This enables the selection of a portion of the generated variation so that when used with a packaging machine or tube bag producing, filling or closing machine an undesirable relative movement of the heat seal jaws is avoided at the time the foil tube 4 is folded flat, which is just prior to the welding step. The same requirement could be met by an arrangement in which the joint journal 19 of the individual Kardan joints 7,8,9 and 10 is arranged in a manner deviating somewhat from the arrangement described above.

Figure 2:
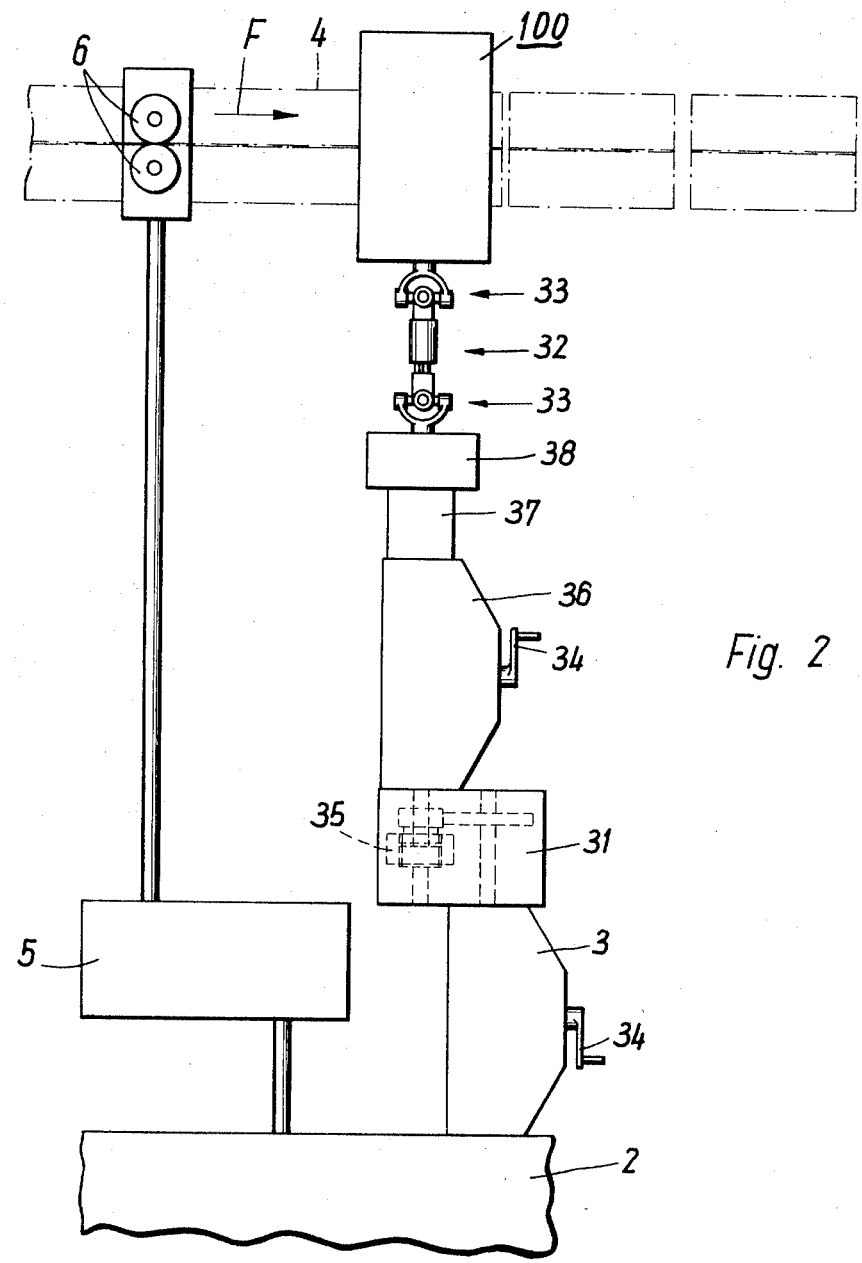
FIG. 2 is a view similar to FIG. 1 showing a modification thereof.

The arrangement shown in FIG. 2 differs from that shown in FIG. 1 in that the wheel drive 31 is associated with a second drive 36 for generating an adjustable periodic variation which, by means of a bearing 37 and a connecting clutch 38, drives the cross-welding device directly or indirectly. The second drive 36 may be constructed the same as the first and provided with four Kardan joints (not shown) and be made adjustable by means of actuating the handle 34. The clutch 38 serves to align the Kardan joints of the second drive 36 relative to the welding tools 104.

Using clutch 35, the Kardan joints of the second drive 36 can be aligned relative to the first drive. With the help of the second drive 36, the cyclic variation can be selectively enlarged or reduced by means of the first drive 3. With a suitable adjustment of the clutch 35 and both drives 3 and 36 there is established at the exit of the second drive 36, for instance rotary motion, which during a relatively long period of time necessary for one revolution, has a relatively constant speed and the desired ratio to the average r.p.m. As a result, it is possible to have the welding tools 104 engage the foil tube 4 during a relatively long portion of a revolution which, as initially noted, increases the efficiency.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A drive comprising in combination a device for heat treating an endless foil moving with uniform speed along a predetermined path, said device including heat seal tools movable intermittently along said path and said drive including a Kardan joint having an adjustable joint axis and being effective to generate cyclic variation.

2. A drive according to claim 1, wherein four Kardan joints are arranged in series; and three intermediate shafts for inter-connecting said joints; each joint having a journal disposed in sequence 90° apart; the center shaft of said three shafts being transversely arranged and adjustable relative to the center journal of said four Kardan joints.

3. A drive according to claim 1, and a wheel drive between said device and said drive for adjusting the cyclic variations thereof, said wheel drive having a transformation ratio to effect for each revolution made by said tools, one-half a revolution of said Kardan joint.

4. A drive according to claim 3, and clutch means associated with said wheel drive effective for adjustment of the phase relationship between said tools and said Kardan joint.

5. A drive according to claim 3, wherein said wheel drive is effective to translate the input speed to a higher r.p.m. and is connected to said Kardan joint drive; and a second drive comprising Kardan joints connected to said wheel drive for also generating adjustable cyclic variations, the latter Kardan joint drive being connected to said welding or sealing device.

6. A drive according to claim 5, wherein said wheel drive is effective to double the r.p.m.

7. A drive according to claim 5, including two clutches effective for adjusting the phase position of the first and second Kardan joint drives relative to the revolving tools of said welding or sealing device.

* * * * *